R. A. MOORE.
ANTISKIDDING DEVICE FOR AUTOMOBILES.
APPLICATION FILED NOV. 18, 1910.

1,008,354.

Patented Nov. 14, 1911.

WITNESSES:
E. Larson
S. E. Dodge

INVENTOR
R. A. Moore
BY
Attorneys

UNITED STATES PATENT OFFICE.

ROBERT ALEXANDER MOORE, OF CHICAGO, ILLINOIS, ASSIGNOR TO THE MOORE AUTO SKID PREVENTER COMPANY, OF NEW YORK, N. Y., A CORPORATION OF NEW YORK.

ANTISKIDDING DEVICE FOR AUTOMOBILES.

1,008,354. Specification of Letters Patent. Patented Nov. 14, 1911.

Application filed November 18, 1910. Serial No. 593,100.

*To all whom it may concern:*

Be it known that I, ROBERT ALEXANDER MOORE, a citizen of the United States, residing at Chicago, in the county of Cook and State of Illinois, have invented certain new and useful Improvements in Antiskidding Devices for Automobiles, of which the following is a specification.

The present invention comprises an improved device for preventing the skidding or slipping of automobiles, or similar vehicles, capable of being driven at a high speed over a surface.

The improvements hereinafter described relate particularly to the type of anti-skidding means, wherein a shoe or similar support is mounted upon the vehicle and movable toward and from the surface of the ground, said shoe having tread members for positive engagement with said surface to counteract skidding tendencies. Necessarily a device of the class of the invention will, under normal conditions of service, be operated so as to cause its tread members to be engaged with uneven surfaces over which the vehicle may travel.

A special feature of the present invention resides in the mounting of the tread members upon the shoe, or other movable support, whereby the tread members may accommodate themselves by movement relative to their support with respect to uneven surfaces over which they travel, not being held rigid so as to cause injury to the surface operated upon for the prevention of skidding.

Figure 1:
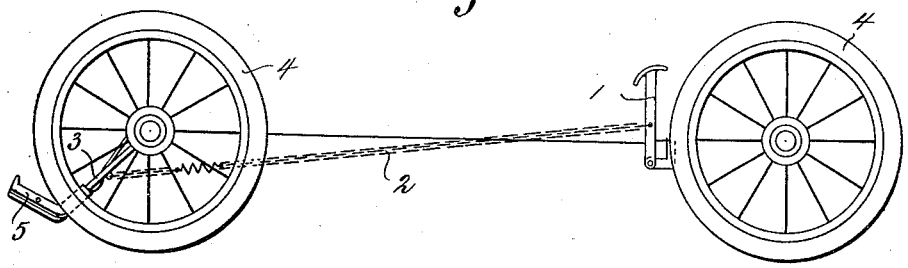
Figure 2:
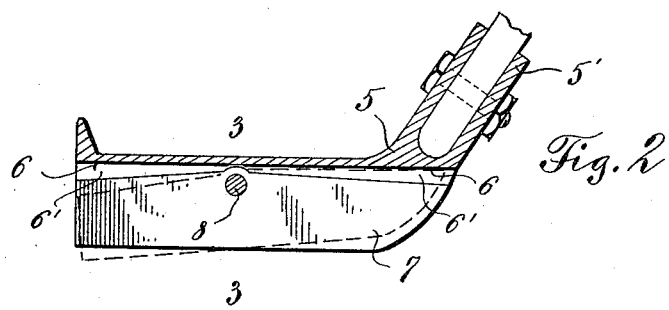
Figure 3:
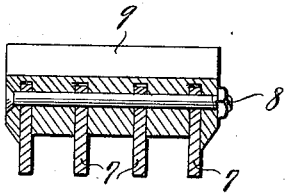
Figure 4:
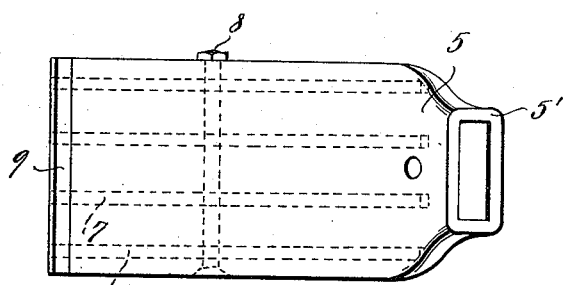

For a full understanding of the present invention, reference is to be had to the following description and to the accompanying drawings, in which Figure 1 is a side elevation, showing a vehicle body in a diagrammatic manner, and illustrating the invention mounted thereon; Fig. 2 is a longitudinal sectional view of the shoe carried by the vehicle, showing the tread members or blades in position; Fig. 3 is a transverse section taken about on the line 3—3 of Fig. 2; Fig. 4 is a top plan view of the shoe and associated tread members.

In the drawings, 1 denotes a foot lever, or similar operating device of any equivalent type, which is connected by a flexible member such as a chain, or the like, indicated at 2, with the arm 3 pivotally supported in any substantial manner, preferably upon the rear axle of the vehicle, which has the usual wheels 4.

The arm 3 carries a shoe 5 at its lower end, and said shoe is elongated and provided upon its under side with a plurality of longitudinal recesses 6. Seated in the recesses 6 are a plurality of tread members 7 of a number corresponding to the number of recesses, said tread members consisting of hard metal blades or plates, the lower edge portions of which project below the under side of the shoe, as shown clearly in Fig. 3 of the drawings.

The mounting of the blades 7 is peculiar in that the same are supported at points centrally of their ends by a pivot 8 passing transversely through the upper portion of the shoe 5. The pivot 8 provides a rocker bearing for the several tread members or blades 7, the upper edge portions of the latter sloping downwardly from a point adjacent to the pivot 8. Normally the tread members 7 are supported in approximately horizontal positions, and the oppositely sloping upper edge of each tread member provides the clearance spaces 6' permitting of the rocking movement of the parts 7, whereby the latter accommodate themselves to the unevenness of the surface over which the vehicle carrying the anti-skidding device may be traveling.

At its rear end, the shoe 5 may have an upwardly projecting transverse flange 9 constituting a stop to assist in preventing unauthorized rearward movement of the vehicle, the flange 9 being adapted to be embedded in a surface for this purpose, by operation of the device from the foot lever 1.

The front end of the shoe preferably curves downwardly and rearwardly from the shank 5' attached to the arm 3, and the front extremities of the tread members 7 are preferably similarly formed with a curvature corresponding to that of the above mentioned portion of the shoe.

Having thus described the invention, what is claimed as new is:

1. An anti-skidding device for automobiles comprising a shoe adapted to be moved toward and from the ground, and tread members mounted for rocking movement on said shoe while in engagement with the ground.

2. An anti-skidding device for automobiles comprising a shoe adapted to be moved toward and from the ground, rocking tread members arranged longitudinally of the shoe, and pivotal connections between said tread members and the shoe permitting movement of the tread members relative to the shoe while engaging the ground.

3. An anti-skidding device for automobiles, comprising a shoe adapted to be moved toward and from the surface of the ground, tread members disposed longitudinally of the shoe beneath the same and having oppositely sloping upper edge portions spacing the opposite ends of said members from the shoe, and connecting means between the intermediate portions of the tread members and the shoe, permitting relative movement of said parts.

4. An anti-skidding device for automobiles comprising a shoe provided on its under side with a plurality of longitudinal recesses, tread members seated in said recesses, and pivotal means passing transversely through the shoe and tread members, pivotally connecting the latter to the shoe for pivotal movement, the opposite ends of the shoe being arranged to engage the tread members to limit their pivotal movement.

5. An anti-skidding device comprising a shoe provided on its under side with longitudinal recesses and having its front end curving downwardly and rearwardly, tread members comprising blades seated in the recesses aforesaid and having their upper edges sloping downwardly in opposite directions from an intermediate point in their length, and a pivot passing transversely through the shoe and the blades, connecting the latter to the shoe for rocking movement thereon, the front ends of the blades being curved downwardly and rearwardly to correspond with the curvature of the front end of the shoe.

In testimony whereof I affix my signature in presence of two witnesses.

ROBERT ALEXANDER MOORE.

Witnesses:
H. R. TIPPENHAUER,
EDW. G. W. FERGUSON.

---

Copies of this patent may be obtained for five cents each, by addressing the "Commissioner of Patents, Washington, D. C."